US011889170B2

(12) United States Patent
Watanabe

(10) Patent No.: US 11,889,170 B2
(45) Date of Patent: Jan. 30, 2024

(54) IMAGING DEVICE, ELECTRONIC EQUIPMENT, AND IMAGING METHOD THAT CHANGE PROCESSING BASED ON DETECTED TEMPERATURE

(71) Applicant: Sony Semiconductor Solutions Corporation, Kanagawa (JP)

(72) Inventor: Goshi Watanabe, Saitama (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 227 days.

(21) Appl. No.: 17/419,942

(22) PCT Filed: Feb. 10, 2020

(86) PCT No.: PCT/JP2020/005204
§ 371 (c)(1),
(2) Date: Jun. 30, 2021

(87) PCT Pub. No.: WO2020/170890
PCT Pub. Date: Aug. 27, 2020

(65) Prior Publication Data
US 2022/0070349 A1    Mar. 3, 2022

(30) Foreign Application Priority Data
Feb. 19, 2019  (JP) ................. 2019-027882

(51) Int. Cl.
*H04N 23/52* (2023.01)
*G06V 20/00* (2022.01)
(Continued)

(52) U.S. Cl.
CPC ............ *H04N 23/52* (2023.01); *G01K 13/00* (2013.01); *G06N 3/04* (2013.01); *G06T 1/0007* (2013.01);
(Continued)

(58) Field of Classification Search
CPC ...... H04N 23/52; H04N 23/665; H04N 23/80; H04N 23/617; H04N 23/81; H04N 25/42;
(Continued)

(56) References Cited

U.S. PATENT DOCUMENTS 9,093,573 B2 *  7/2015  Wang ..................... H04N 25/53
9,989,980 B1 *  6/2018  Urban .................... G03B 17/55
(Continued)

FOREIGN PATENT DOCUMENTS

| CN | 102377905 A | 3/2012 |
| JP | 2002-310804 A | 10/2002 |
| WO | 2018/051809 A1 | 3/2018 |

OTHER PUBLICATIONS

Amir Mohammad Faisal et al: "3-D Stacked Image Sensor With Deep Neural Network Computation", IEEE Sensors Journal, IEEE, USA, vol. 18, No. 10, May 15, 2018 (May 15, 2018), pp. 4187-4199, XP011681876, ISSN: 1530-437X, DOI: 10.1109/JSEN.2018. 2817632 [retrieved on Apr. 23, 2018].
(Continued)

*Primary Examiner* — Twyler L Haskins
*Assistant Examiner* — Akshay Trehan
(74) *Attorney, Agent, or Firm* — Michael Best & Friedrich LLP

(57) ABSTRACT

An imaging device, electronic equipment, and an imaging method capable of controlling a temperature rise are provided. The imaging device (CIS 2) according to the present disclosure includes an imaging unit (22), an information processing unit (DNN processing unit 23), a temperature detection unit (25), and a control unit (CIS control unit 21). The imaging unit (22) captures an image and generates image data. The information processing unit (DNN processing unit 23) performs processing with respect to the image data read from the imaging unit (22). The temperature
(Continued)

detection unit (25) detects temperature. The control unit (CIS control unit 21) changes the processing performed by the information processing unit (DNN processing unit 23) according to the temperature detected by the temperature detection unit (25).

20 Claims, 11 Drawing Sheets

(51) Int. Cl.
*G01K 13/00* (2021.01)
*G06N 3/04* (2023.01)
*G06T 5/30* (2006.01)
*H04N 23/80* (2023.01)
*H04N 23/60* (2023.01)
*G06V 10/82* (2022.01)
*H04N 23/617* (2023.01)
*H04N 23/81* (2023.01)
*H04N 25/42* (2023.01)
*H04N 25/443* (2023.01)
*H04N 25/79* (2023.01)
*G06T 1/00* (2006.01)

(52) U.S. Cl.
CPC ............... *G06T 5/30* (2013.01); *G06V 10/82* (2022.01); *G06V 20/00* (2022.01); *H04N 23/617* (2023.01); *H04N 23/665* (2023.01); *H04N 23/80* (2023.01); *H04N 23/81* (2023.01); *H04N 25/42* (2023.01); *H04N 25/443* (2023.01); *H04N 25/79* (2023.01)

(58) Field of Classification Search
CPC ...... H04N 25/443; H04N 25/79; G01K 13/00; G06T 1/0007; G06T 5/30; G06V 20/00; G06V 10/82; G06F 1/20; G06F 1/203; G06F 1/206
See application file for complete search history.

(56) References Cited

U.S. PATENT DOCUMENTS

| | | |
|---|---|---|
| 11,116,050 B1* | 9/2021 | Bhogal ................. H05B 6/68 |
| 2009/0219417 A1* | 9/2009 | Tsuruoka ............... G06T 5/002 |
| | | 348/241 |
| 2014/0078351 A1* | 3/2014 | Minami ................. H04N 23/81 |
| | | 348/241 |
| 2015/0172539 A1* | 6/2015 | Neglur .................. H04N 23/90 |
| | | 348/222.1 |
| 2017/0102676 A1* | 4/2017 | Park ....................... G06F 1/206 |
| 2017/0187933 A1* | 6/2017 | Duparre ............ H01L 27/14625 |
| 2018/0183998 A1* | 6/2018 | Menachem ............... G06T 3/40 |
| 2020/0351440 A1* | 11/2020 | Seta ..................... H04N 23/661 |

OTHER PUBLICATIONS

International Search Report (PCT/ISA/210), International Application No. PCT/JP2020/005204, dated Apr. 28, 2020.
Notification of Transmittal of the International Search Report and the Written Opinion of the International Searching Authority, or the Declaration (PCT/ISA/220), International Application No. PCT/JP2020/005204, dated May 19, 2020.
Written Opinion of the International Search Authority (PCT/ISA/237), International Application No. PCT/JP2020/005204, dated May 19, 2020.

* cited by examiner

IMAGING DEVICE, ELECTRONIC EQUIPMENT, AND IMAGING METHOD THAT CHANGE PROCESSING BASED ON DETECTED TEMPERATURE

FIELD

The present disclosure relates to an imaging device, electronic equipment, and an imaging method.

BACKGROUND

For example, an imaging device such as a complementary metal oxide semiconductor (CMOS) image sensor is mounted on electronic equipment represented by a digital camera or the like. The imaging device performs various kinds of processing on a captured image and performs an output thereof to an external device such as an application processor.

CITATION LIST

Patent Literature

Patent Literature 1: WO 2018/051809

SUMMARY

Technical Problem

However, in an imaging device, when an amount of processing performed in a chip of the imaging device is increased, a temperature in the chip rises and noise may be generated in an analog circuit in the chip due to the rise in the temperature. Thus, an imaging device and electronic equipment capable of controlling a temperature rise are desired.

Thus, an imaging device, electronic equipment, and an imaging method capable of controlling a temperature rise are proposed in the present disclosure.

Solution to Problem

A imaging device according to the present disclosure includes an imaging unit, an information processing unit, a temperature detection unit, and a control unit. The imaging unit captures an image and generates image data. The information processing unit performs processing with respect to the image data read from the imaging unit. The temperature detection unit detects temperature. The control unit changes the processing performed by the information processing unit according to the temperature detected by the temperature detection unit.

DESCRIPTION OF EMBODIMENTS

In the following, embodiments of the present disclosure will be described in detail on the basis of the drawings. Note that in each of the following embodiments, overlapped description is omitted by assignment of the same reference sign to identical parts.

1. First Embodiment

Figure 1:
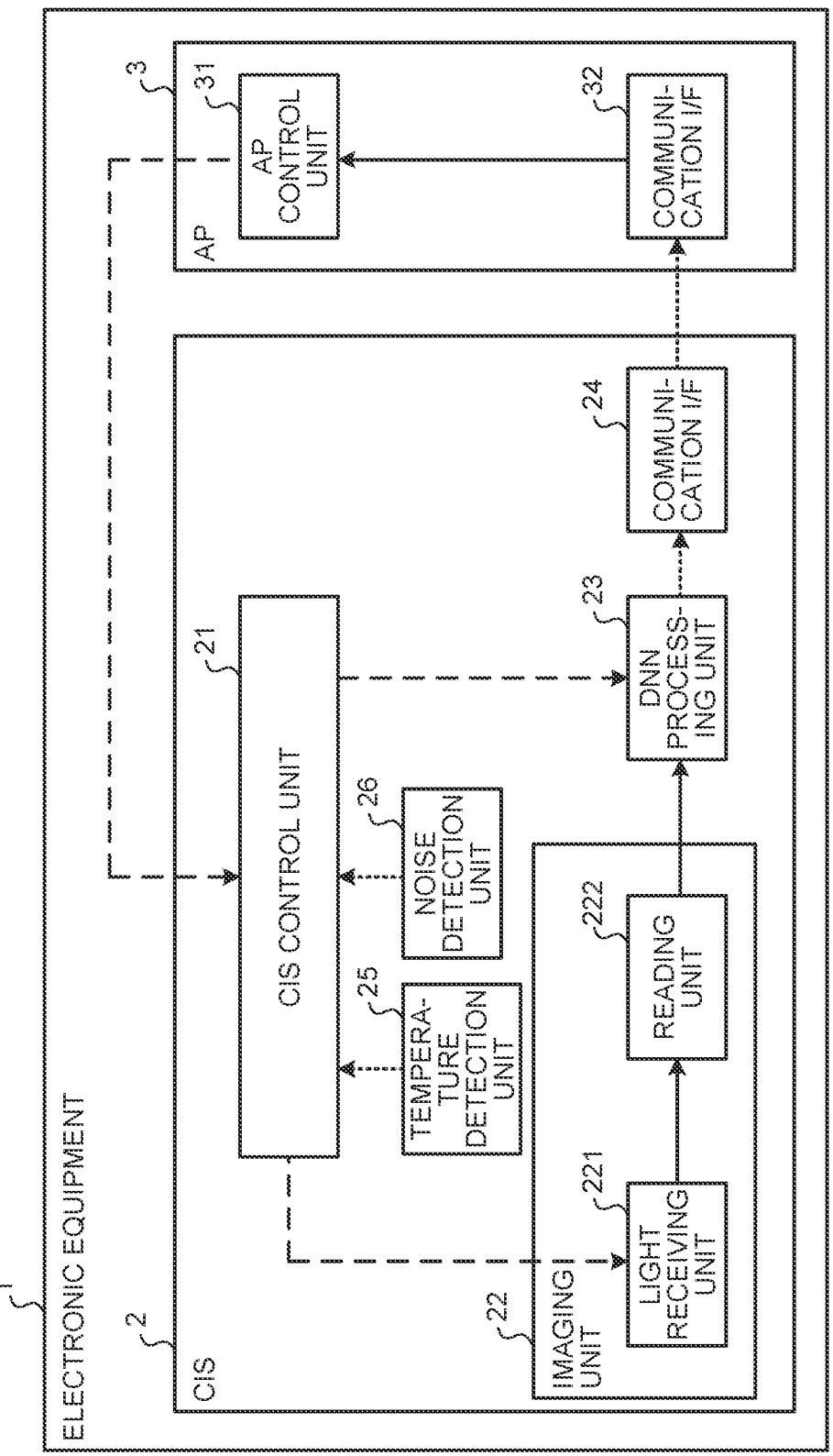
FIG. 1 is a block diagram illustrating a schematic configuration example of electronic equipment according to a first embodiment.

1-1. Configuration of Electronic Equipment According to the First Embodiment FIG. 1 is a block diagram illustrating a schematic configuration example of electronic equipment according to the first embodiment. Note that a flow of image data is indicated by a solid arrow, a flow of control data is indicated by a dashed arrow, and a flow of non-image data is indicated by a dotted arrow in FIG. 1.

Electronic equipment 1 illustrated in FIG. 1 is, for example, a digital camera or a digital video camera, has a function of performing information processing such as estimation, recognition, and discrimination of an object in addition to a function of capturing a still image or a moving image, and is used for various purposes.

For example, the electronic equipment 1 is used for person estimation (estimation of a face, age, gender, who, and the like), product estimation (estimation of which product in a store or warehouse), estimation of a posture of a person (motion capture), estimation of an emotion of a person, semantic segmentation (automatic driving), and the like.

Also, the electronic equipment 1 is used for detection of a defective product in a factory or the like, image processing by generative adversarial network (GAN) or the like, crime prevention (such as detection of a suspicious person or abandonment), medical care (detection of disease), agriculture (such as harvest time determination), and the like.

As illustrated in FIG. 1, such electronic equipment 1 has a complementary metal oxide semiconductor (CMOS) image sensor (hereinafter, referred to as CIS 2) and an application processor (hereinafter, referred to as AP 3).

The CIS 2 is an example of an imaging device that includes one chip and captures an image. Note that an imaging device according to the present disclosure is not limited to the CIS 2, and may be another image sensor such as a charge coupled device (CCD) image sensor.

Also, the AP 3 includes an AP control unit 31 that is an example of a processor such as a central processing unit (CPU) to execute various application programs corresponding to a use of the electronic equipment 1, and a communication interface (I/F) 32 that performs information communication with the CIS 2.

Here, a general digital camera captures an image by the CIS, outputs image data of the captured image from the CIS to the AP, and performs estimation, recognition, discrimination, and the like of an object by performing the above-described various kinds of information processing by the AP with respect to the image data.

However, in order to perform the information processing such as estimation, recognition, and discrimination of an object on a side of the AP, it is necessary to output image data having a large data amount from the CIS to the AP, and there is a problem that power consumption of the CIS becomes high.

Also, the AP transmits/receives data to/from an external device depending on a use of the digital camera. Thus, there is a possibility that personal information such as image data leaks to the outside of the digital camera, and protection of security and privacy is necessary. Thus, it is desirable that the digital camera performs information processing such as estimation, recognition, and discrimination of an object in the CIS, and outputs a processing result of the information processing to the AP instead of image data.

However, in the CIS, a processing load is increased and a temperature in a chip rises when complicated information processing such as estimation, recognition, and discrimination of an object is performed, and there is a case where noise is generated in an analog circuit in the chip due to the temperature rise.

Thus, the electronic equipment 1 has a configuration of controlling a temperature rise in the CIS 2 by changing processing, which is performed by a processing unit that performs complicated information processing in the chip of the CIS 2, according to a temperature in the CIS 2. Furthermore, the electronic equipment 1 has a configuration of controlling the temperature rise in the CIS 2 by changing processing, which is performed by an information processing unit, according to noise generated in an analog circuit in the CIS 2.

Specifically, as illustrated in FIG. 1, the CIS 2 includes a CIS control unit 21, an imaging unit 22, a deep neural network (DNN) processing unit 23, and a communication I/F 24. The CIS control unit 21 includes a microcomputer having a CPU, a read only memory (ROM), a random access memory (RAM), and the like, and various circuits.

The CPU executes a program stored in the ROM while using the RAM as a work area, whereby the CIS control unit 21 controls operations of the imaging unit 22 and the DNN processing unit 23. Mote that a part or whole of the CIS control unit 21 may include hardware such as an application specific integrated circuit (ASIC) or a field programmable gate array (FPGA).

The imaging unit 22 includes a light receiving unit 221 and a reading unit 222. The light receiving unit 221 includes, for example, an optical system including a zoom lens, a focusing lens, a diaphragm, and the like, and a pixel array portion in which unit pixels, each of which has a light receiving element such as a photodiode, are arrayed in a two-dimensional matrix.

The light receiving unit 221 forms an image of light incident from the outside on a light receiving surface of the pixel array portion by the optical system. Each unit pixel or the pixel array portion photoelectrically converts the light incident on the light receiving element, and accumulates, in a readable manner, electric charge corresponding to an amount of the incident light.

The reading unit 222 includes a reading circuit that reads, as a pixel signal, the electric charge accumulated in each unit pixel, and an analog to digital converter (ADC) that generates digital image data by converting the analog pixel signal read by the reading circuit into a digital value.

The reading unit 222 outputs the generated image data to the DNN processing unit 23 in a unit of images in one frame. Note that the reading unit 222 may include a memory that stores image data by images in one frame, and may output the image data once stored in the memory to the DNN processing unit 23.

The DNN processing unit 23 includes a microcomputer having a CPU, ROM, RAM, and the like, and various circuits. The DNN processing unit 23 is a processing unit that performs DNN processing using a DNN with respect to image data when the CPU executes a program stored in the ROM while using the RAM as a work area.

By using a DNN acquired from the AP 3, the DNN processing unit 23 sequentially executes the DNN processing of multiplying a dictionary coefficient of each layer in the DNN with the image data from the shallowest layer to deeper layers of the DNN, and performs information processing such as estimation, recognition, and discrimination of an object.

Then, instead of the image data, the DNN processing unit 23 outputs DNN information that is metadata including information processing results such as an estimation result, recognition result, and discrimination result of the object to the communication I/P 24 and causes an output thereof to the AP 3.

In such a manner, although causing the DNN information that is the metadata including the information processing results to be output to the AP 3, the DNN processing unit 23 does not cause the image data to be output to the AP 3. Thus, the CIS 2 can reduce power consumption required to output the image data, and protect security and privacy since the personal information included in the image data does not leak to the outside of the chip.

However, since the DNN processing unit 23 perform a huge amount of arithmetic processing, heat may be generated during the DNN processing and the temperature inside the CIS 2 may be raised. In such a case, in the CIS 2, noise may be generated in an analog circuit included in the light receiving unit 221 or the reading unit 222 of the imaging unit 22 due to the heat generated by the DNN processing unit 23.

Thus, the CIS control unit 21 controls the temperature rise by changing the processing, which is performed by the DNN processing unit 23, according to results of detection by a temperature detection unit 25 and a noise detection unit 26.

Specifically, the temperature detection unit 25 detects the temperature inside the CIS 2 and outputs temperature information that is a result of the detection to the CIS control unit 21. Also, the noise detection unit 26 detects an amount of noise (noise amount) generated in the analog circuit of the imaging unit 22, and outputs noise information that a result of the detection to the CIS control unit 21.

The CIS control unit 21 can control the temperature rise by reducing a processing amount, processing speed, or the like of the DNN processing unit 23 in a case where temperature information indicating an abnormal temperature exceeding a normal temperature is input from the temperature detection unit 25.

Also, the CIS control unit 21 can control the temperature rise by reducing the processing amount, processing speed, or the like of the DNN processing unit 23 in a case where noise information indicating an abnormal noise amount exceeding an acceptable range (normal range) is input from the noise detection unit 26.

Figure 2:
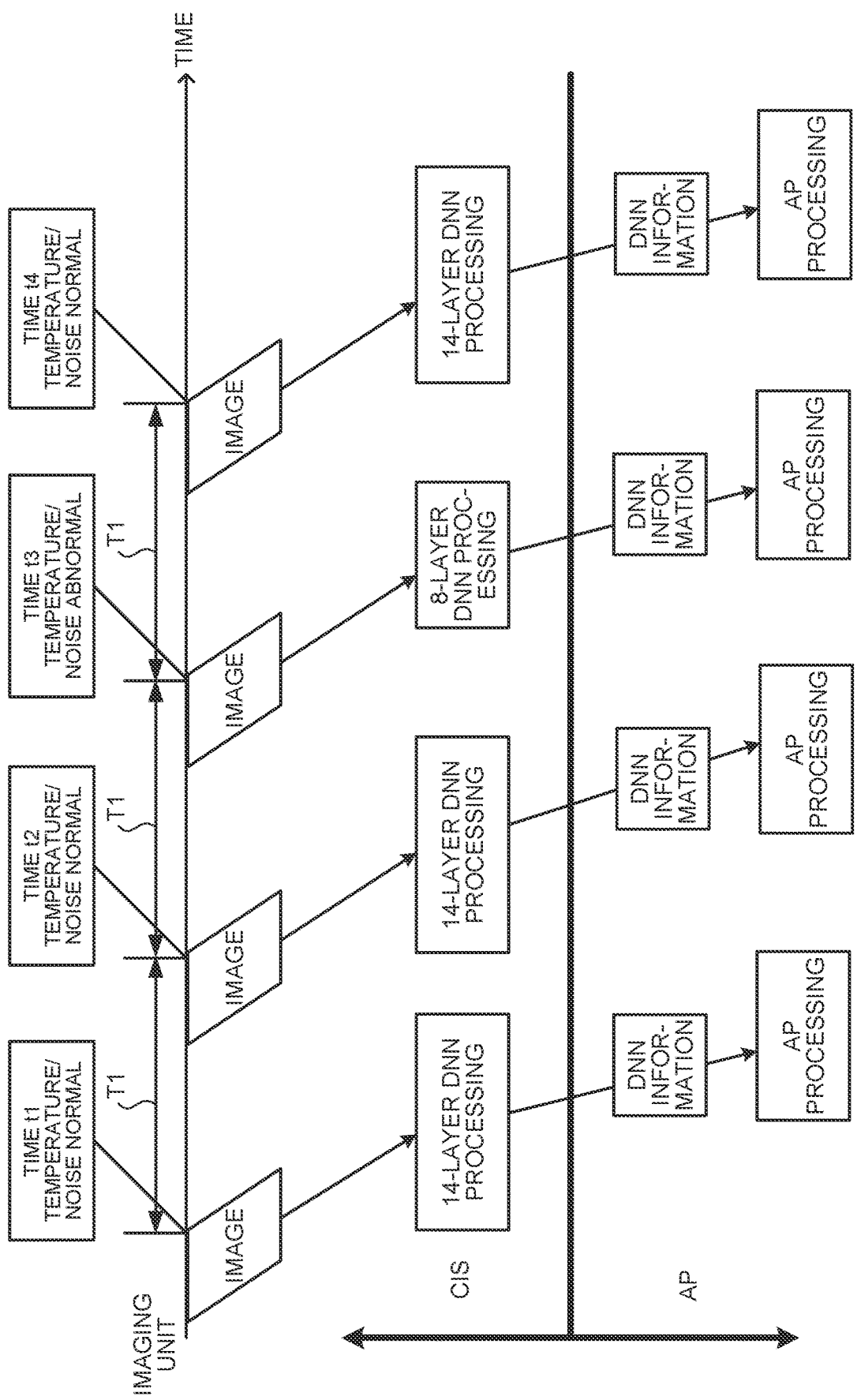
FIG. 2 is a view for describing first control according to the first, embodiment.
Figure 3:
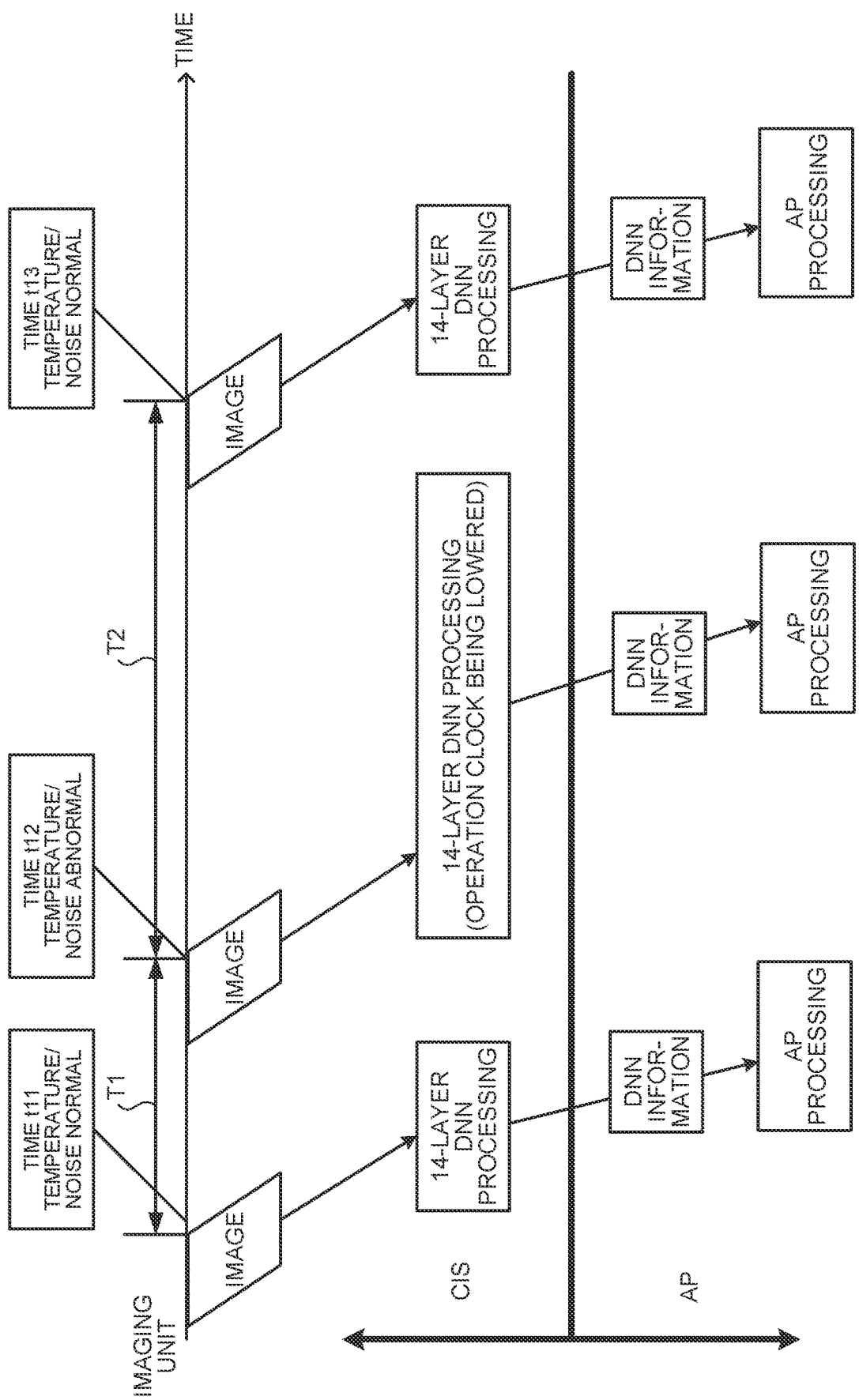
FIG. 3 is a view for describing second control according to the first embodiment.

Next, control performed by the CIS control unit 21 will be described with reference to FIG. 2 to FIG. 5. The CIS control unit 21 controls the temperature information of the CIS 2 by performing first to fourth control described in the following. FIG. 2 is a view for describing the first control according to the first embodiment. FIG. 3 is a view for describing the second control according to the first embodiment.

Figure 4:
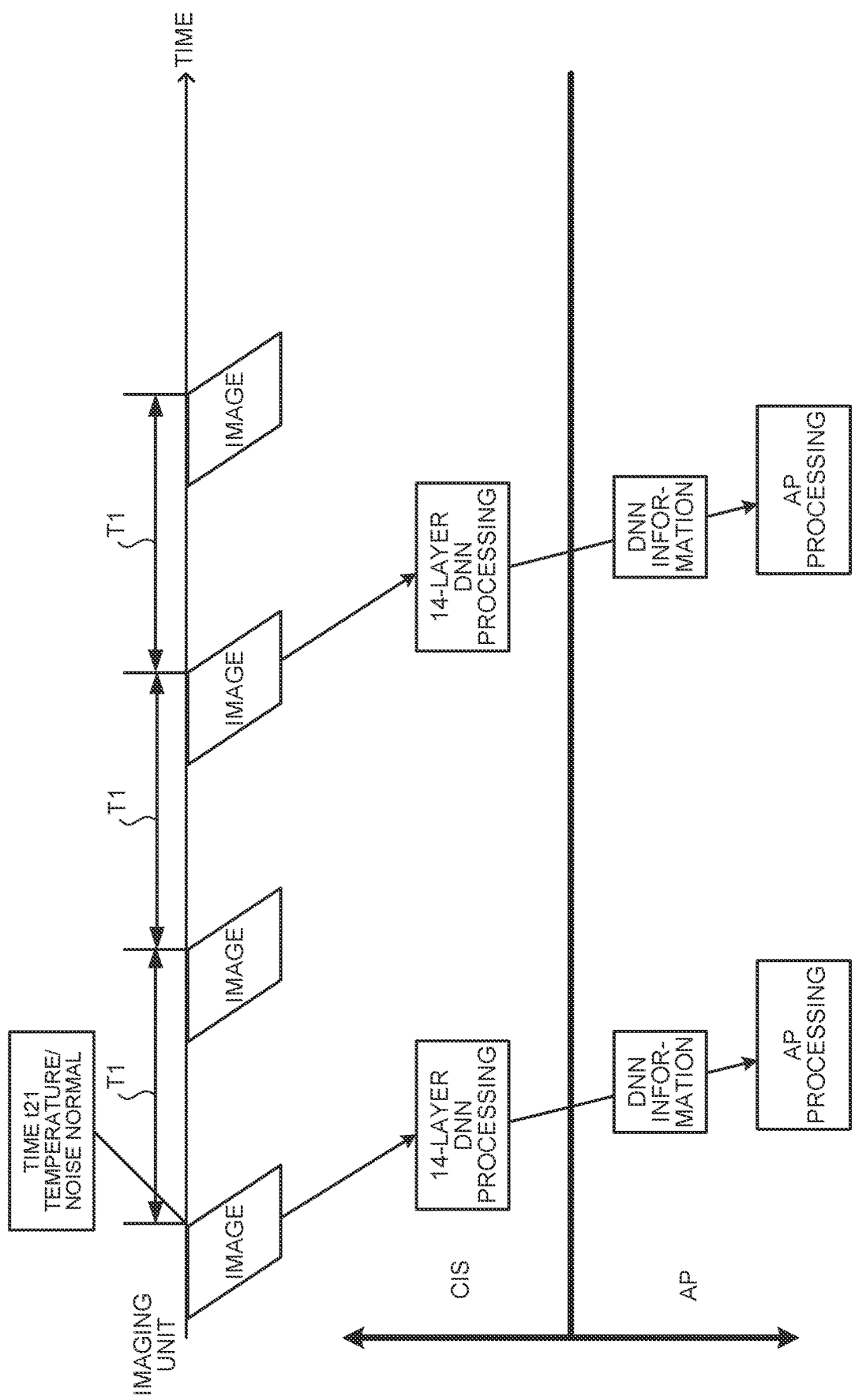
FIG. 4 is a view for describing third control according to the first embodiment.
Figure 5:
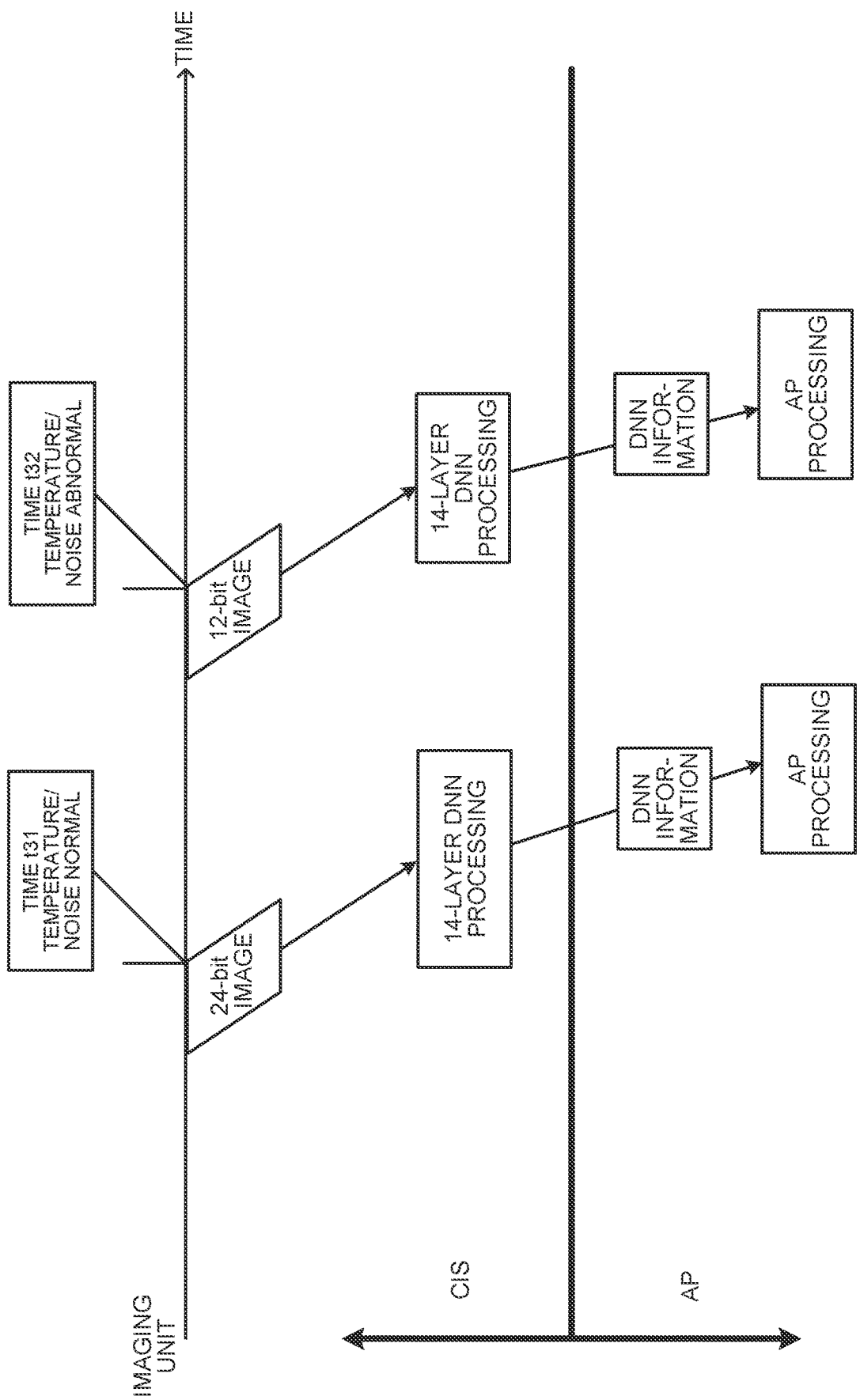
FIG. 5 is a view for describing fourth control according to the first embodiment.

FIG. 4 is a view for describing the third control according to the first embodiment. FIG. 5 is a view for describing the fourth control according to the first embodiment. Note that in each of FIGS. 2 to 5, states of a temperature of the CIS 2 and noise generated in the analog circuit at each time, processing of the imaging unit 22, processing of the DNN processing unit 23, and processing of the AP 3 are illustrated in order from the top.

1-2. First Control Performed by the CIS Control Unit

In the first control, the CIS control unit 21 acquires a plurality of DNNs having layers of different depths from the AP 3 in advance and causes the RAM or ROM of the DNN processing unit 23 to perform storing thereof. The CIS control unit 21 makes selection from a plurality of DNNs according to states of the temperature/noise in the CIS 2 and changes a DNN used by the DNN processing unit 23.

For example, the CIS control unit 21 acquires a 14-layer DNN and an 8-layer DNN in advance from the AP 3 and causes the DNN processing unit 23 to perform storing thereof. Then, as illustrated in FIG. 2, the CIS control unit 21 causes the imaging unit 22 to capture an image at a predetermined time interval T1, that is, at a constant frame rate and to sequentially output image data of the captured image to the DNN processing unit 23.

The DNN processing unit 23 performs DNN processing on the image data sequentially input from the imaging unit 22, and outputs DNN information that is a result of the DNN processing to the AP 3. By using the DNN information sequentially input from the DNN processing unit 23, the AP 3 performs AP processing of executing various application programs corresponding to the use of the electronic equipment 1.

In the series of processing, for example, in a case of determining that a temperature/noise in the CIS 2 is normal at time t1 and there is no need to limit the processing performed by the DNN processing unit 23, the CIS control unit 21 causes the DNN processing unit 23 to perform the DNN processing by using the 14-layer DNN.

Then, in a case of determining that the temperature/noise is normal in the CIS 2 at time t2 and there is no need to limit the processing performed by the DNN processing unit 23, the CIS control unit 21 causes the DNN processing unit 23 to perform the DNN processing by using the 14-layer DNN.

In such a manner, the CIS control unit 21 can cause highly-reliable DNN information to be output to the AP 3 by causing the DNN processing unit 23 to perform the DNN processing by using the 14-layer DNN each time during a period in which the temperature/noise in the CIS 2 is normal.

Then, in a case of determining that the temperature/noise in the CIS 2 becomes abnormal at time t3 and there is a need to limit the processing performed by the DNN processing unit 23, the CIS control unit 21 causes the DNN processing unit 23 to perform the DNN processing by using a DNN having eight layers shallower than the 14 layers.

As a result, since an information processing amount of the DNN processing unit 23 is reduced by six layers as compared with a case where the 14-layer DNS is used, operating time can be shortened for that amount and the temperature rise can be controlled.

Then, in a case of determining that the temperature/noise in the CIS 2 returns to normal at time t4 and there is no need to limit the processing performed by the CNN processing unit 23, the CIS control unit 21 returns the DNN by the DNN processing unit 23 from the 8-layer DNN to the 14-layer DNN and causes the DNN processing to be per formed.

In such a manner, only in a period in which the temperature/noise in the CIS 2 is abnormal, the CIS control unit 21 causes the DNN processing unit 23 to perform the DNN processing using a DNN having a smaller number of (shallower) layers than that in a normal period. As a result, the CIS control unit 21 can control the temperature rise in the CIS 2 without significantly damaging reliability of the DNN information output to the AP 3.

Note that in a case where the AP 3 has a DNN processing unit, the CIS control unit 21 can control the temperature rise in the CIS 2 by causing the DNN processing unit 23 to use only one type of DNN, and changing a depth of layers, on which the DNN processing is performed, among all the layers in the DNN.

For example, in a case of acquiring the 14-layer DNN from the AP 3 and causing the DNN processing unit 23 perform storing thereof, the CIS control unit 21 causes the DNN processing unit 23 to perform the DNN processing with respect to all of the 14 layers of the DNN in a period in which the temperature/noise in the CIS 2 is normal. Then, the DUN processing unit 23 outputs only the DNN information to the AP 3 without outputting the image data to the AP 3.

Also, in the period in which the temperature/noise in the CIS 2 is abnormal, the CIS control unit 21 causes the DNN processing to be performed up to a layer in a depth in which the temperature of the DNN processing unit 23 does not rise among the 14 layers of the DNN.

Then, the DNN processing unit 23 outputs image data in the middle of the processing to the AP 3 together with DNN information indicating up to which layer in the DNN the DNN processing is performed. With respect to the image data input from the DNN processing unit 23, the AP 3 performs a DNN of a layer in an unprocessed part in the DNN.

In such a manner, only in the period in which the temperature/noise in the CIS 2 is abnormal, the CIS control unit 21 causes the DNN processing unit 23 to perform the DNN processing up to a layer in a depth in the middle of all the layers of the DNN, and causes the AP 3 to perform the DNN processing of the remaining layer. As a result, the CIS control unit 21 can control the temperature rise in the CIS 2.

Also, the CIS control unit 21 outputs the image data to the AP 3 only in the period in which the temperature/noise in the CIS 2 is abnormal, but does not output the image data to the AP 3 in most of the period other than that. Thus, it is possible to protect a certain level of security and privacy.

1-3. Second Control Performed by the CIS Control Unit

In the second control, the CIS control unit 21 controls a temperature rise in the CIS 2 by lowering an operation clock of the DNN processing unit 23 in a case where the temperature/noise in the CIS 2 becomes abnormal. For example, as illustrated in FIG. 3, in a case of determining that the temperature/noise in the CIS 2 is normal at time t11 and there is no need to limit the processing performed by the DNN processing unit 23, the CIS control unit 21 causes the DNN processing unit 23 to perform 14-layer DNN processing at a normal operation clock.

Then, in a case of determining that the temperature/noise in the CIS 2 is abnormal at time t12 and there is a need to limit the processing performed by the DNN processing unit 23, the CIS control unit 21 causes the 14-layer DNN processing to be performed with the operation clock of the DNN processing unit 23 being lowered. As a result, the CIS control unit 21 can control a temperature rise in the DNN processing unit 23.

However, when the operation clock is lowered, heat generation is controlled but time of DNN processing of image data in one frame is extended in the DNN processing unit 23. Thus, in a case of lowering the operation clock of the DNN processing unit 23, the CIS control unit 21 lowers a frame rate of the imaging unit 22 and extends a predetermined time interval T1 in which image data is output from the imaging unit 22 to the DNN processing unit 23 (hereinafter, also referred to as 1V period) to T2.

As a result, the CIS control unit 21 can complete the DNN processing by the DNN processing unit 23 with respect to the image data of all frames which data is generated by the imaging unit 22. Then, in a case of determining that the temperature/noise in the CIS 2 returns to normal at time t13 and there is no need to limit the processing performed by the DNN processing unit 23, the CIS control unit 21 returns the operation clock of the DNN processing unit 23 to the normal operation clock and returns the 1V period to the predetermined time interval T1.

In such a manner, since the CIS control unit 21 lowers the operation clock or the DNN processing unit 23 from the normal operation clock only in the period in which the temperature/noise in the CIS 2 is abnormal, it is possible to control the temperature rise in the CIS 2 without significantly lowering a speed of the DNN processing by the DNN processing unit 23.

1-4. Third Control Performed by the CIS Control Unit

In the third control, the CIS control unit 21 controls a temperature rise in the CIS 2 by thinning out image data, on which the DNN processing is performed by the DNN processing unit 23, in a case where the temperature/noise in the CIS 2 becomes abnormal.

For example, as illustrated in FIG. 4, in a case of determining that the temperature/noise in the CIS 2 is abnormal at time t21 and there is a need to limit the processing performed by the DNN processing unit 23, the CIS control unit 21 thins out one of two successively-captured images. Then, the CIS control unit 21 causes the imaging unit 22 to output image data of the other image of the two successively-captured images to the DNN processing unit 23.

As a result, by reducing operating time of the DNN processing unit 23 by half, the CIS control unit 21 can control the temperature rise in the CIS 2. Note that the CIS control unit 21 may thin out one of every three or more successive images, or may thin out two or more images successively. In such a manner, the CIS control unit 21 can control the temperature rise in the CIS 2 by thinning out the image data on which the DNN processing is performed by the DNN processing unit 23.

1-5. Fourth Control Performed by the CIS Control Unit

In the fourth control, in a case where the temperature/noise in the CIS 2 becomes abnormal, the CIS control unit 21 controls a temperature rise in the CIS 2 by changing a data amount of image data in one frame on which data the DNS processing is performed by the DNN processing unit 23.

For example, as illustrated in FIG. 5, in a case of determining that the temperature/noise in the CIS 2 is normal at time t31 and there is no need to limit the processing performed by the DNN processing unit 23, the CIS control unit 21 causes the DNN processing unit 23 to perform the DNN processing of image data having a data amount of 24 bits.

Then, in a case of determining that the temperature/noise in the CIS 2 is abnormal at time t32 and there is a need to limit the processing performed by the DNN processing unit 23, the CIS control unit 21 causes the DNN processing unit 23 to perform the DNN processing of image data having a data amount of 12 bits.

As a result, the CIS control unit 21 can control the temperature rise in the CIS 2 by shortening the processing time of the DNN processing by the DNN processing unit 23 in a case where the temperature/noise in the CIS 2 is abnormal.

The CIS control unit 21 performs the above-described first to fourth control in parallel on the basis of an area map related to the temperature/noise in the CIS 2 and adjustment information associated with the area map (described below).

1-6. Area Map and Adjustment Information

Figure 6:
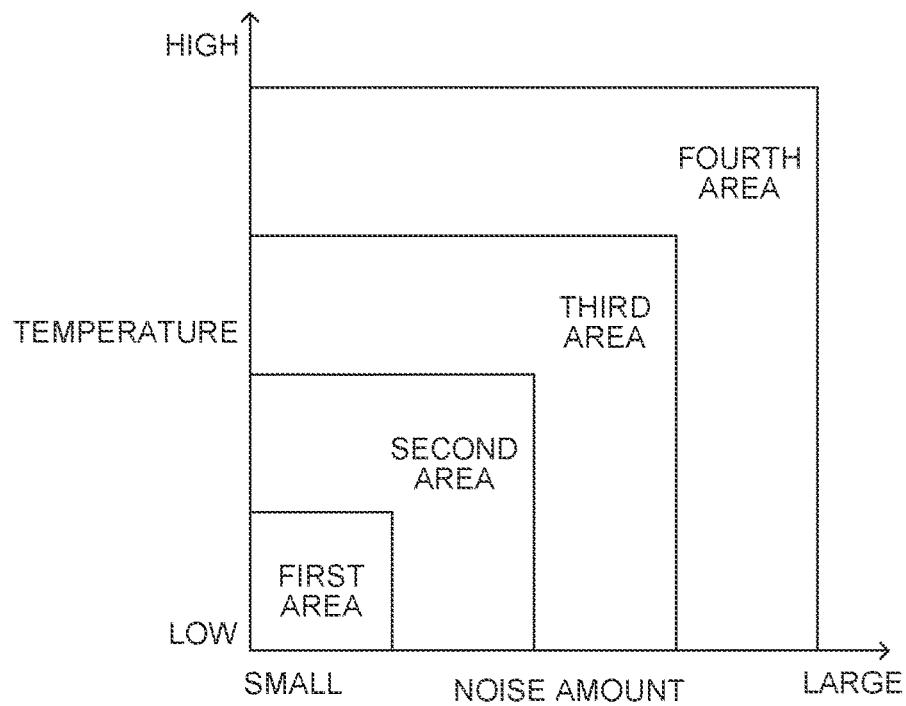
FIG. 6 is a view for describing an area map according to the first embodiment.
Figure 7:
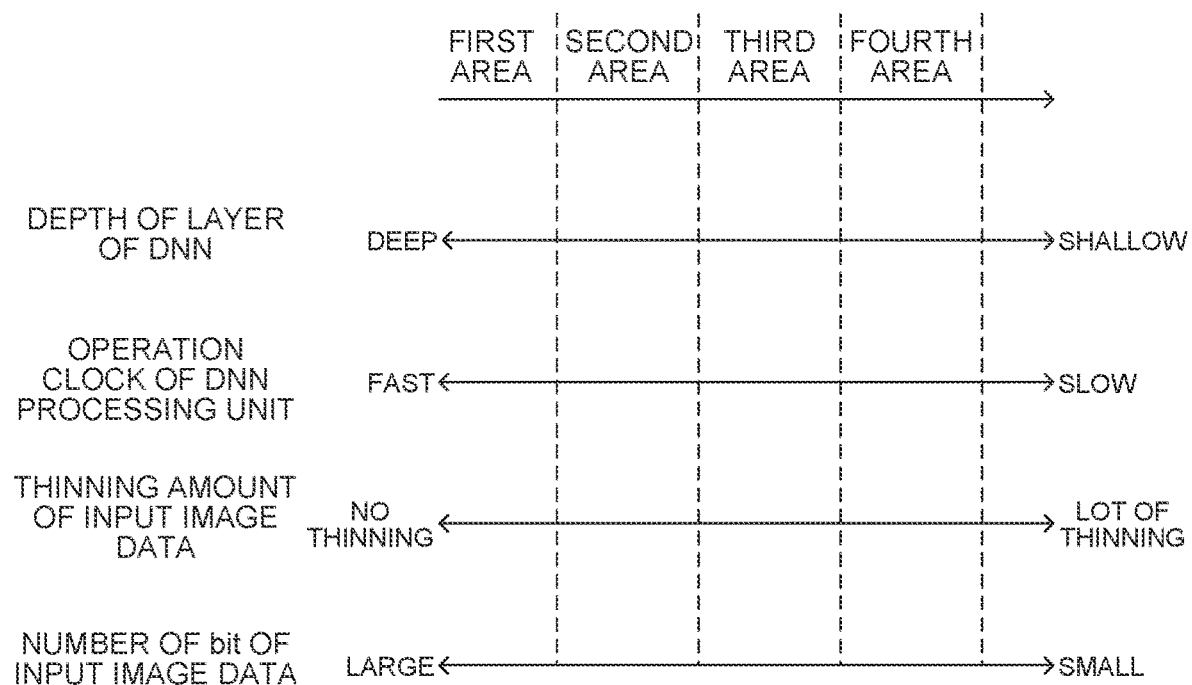
FIG. 7 is a view for describing adjustment information according to the first embodiment.

FIG. 6 is a view for describing an area map according to the first embodiment. FIG. 7 is a view for describing adjustment information according to the first embodiment. As illustrated in FIG. 6, for example, the area map is information in which first to fourth areas are set in a Cartesian coordinate system in which a temperature in the CIS 2 is defined on a vertical axis and a noise amount in the CIS 2 is defined on a horizontal axis.

The first area is an area in which a corresponding temperature is the lowest and a corresponding noise amount is the smallest among the first to fourth areas. The second area is an area in which a corresponding temperature is the second lowest and a corresponding noise amount is the second smallest following the first area.

The third area is an area in which a corresponding temperature is higher and a corresponding noise amount is larger than those of the second area. The fourth area is an area in which a corresponding temperature is the highest and a corresponding noise amount is the largest among the first to fourth areas. Then, adjustment information illustrated in FIG. 7 is associated with the area map illustrated in FIG. 6.

As illustrated in FIG. 7, as the adjustment information, a depth of layers of a DNN used by the DNN processing unit 23, an operation clock of the DNN processing unit 23, a thinning amount of input image data input into the DNN processing unit 23, and an adjustment amount of the number of bits of the input image data are associated with the first to fourth areas.

The CIS control unit 21 stores such an area map and adjustment information in the RAM or ROM. Then, the CIS control unit 21 determines which of the first to fourth areas in the area map includes a state of the CIS 2 on the basis of temperature information input from the temperature detection unit 25 and noise information input from the noise detection unit 26.

Then, with an adjustment amount corresponding to the determined area, the CIS control unit 21 adjusts a depth of layers of the DNN used by the DNN processing unit 23, an operation clock of the DNN processing unit 23, a thinning amount of the input image data input into the DNN processing unit 23, and the number of bits of the input image data.

The CIS control unit 21 makes an adjustment of making the depth of layers of the DNN used by the DNN processing unit 23 the deepest in a case where the determined area is the first area, and makes an adjustment of making the depths of layers shallower in order of the second area, the third area, and the fourth area.

Also, the CIS control unit 21 makes an adjustment of maximizing the operation clock of the DNN processing unit 23 in a case where the determined area is the first area, and makes an adjustment of slowing down the operation clocks in order of the second area, the third area, and the fourth area.

Also, the CIS control unit 21 does not perform thinning cut of the input image data input into the DNN processing unit 23 in a case where the determined area is the first area, and makes an adjustment of increasing thinning amounts in order of the second area, the third area, and the fourth area.

Also, the CIS control unit 21 maximizes the number of bits of the input image data input into the DNN processing unit 23 in a case where the determined area is the first area, and makes an adjustment of decreasing the numbers of bits of the input image data in order of the second area, the third area, and the fourth area.

Note that instead of the area map illustrated in FIG. 6, the CIS control unit 21 may individually store an area map in which a range of a temperature in the CIS 2 is divided into first to fourth areas, and an area map in which a range of a noise amount in the CIS 2 is divided into first to fourth areas.

In such a case, the CIS control unit 21 respectively determines areas with respect to the temperature and the noise amount in the CIS 2, and adjusts the depth of layers of the DNN, the operation clock, the thinning amount of the input image data, and the number of bits of the input image data.

Also, here, a case where the CIS control unit 21 adjusts all of the depth of layers of the DUN, the operation clock, the thinning amount of the input image data, and the number of bits of the input image data has been described, but this is also an example.

The CIS control unit 21 may adjust any one adjustment element among the depth of layers of the DNN, the operation clock, the thinning amount of the input image data, and the number of bits of the input image data, or may multiply adjusts the adjustment elements by combining a plurality of adjustment elements.

1-7. Processing Executed by the CIS Control Unit

Figure 8:
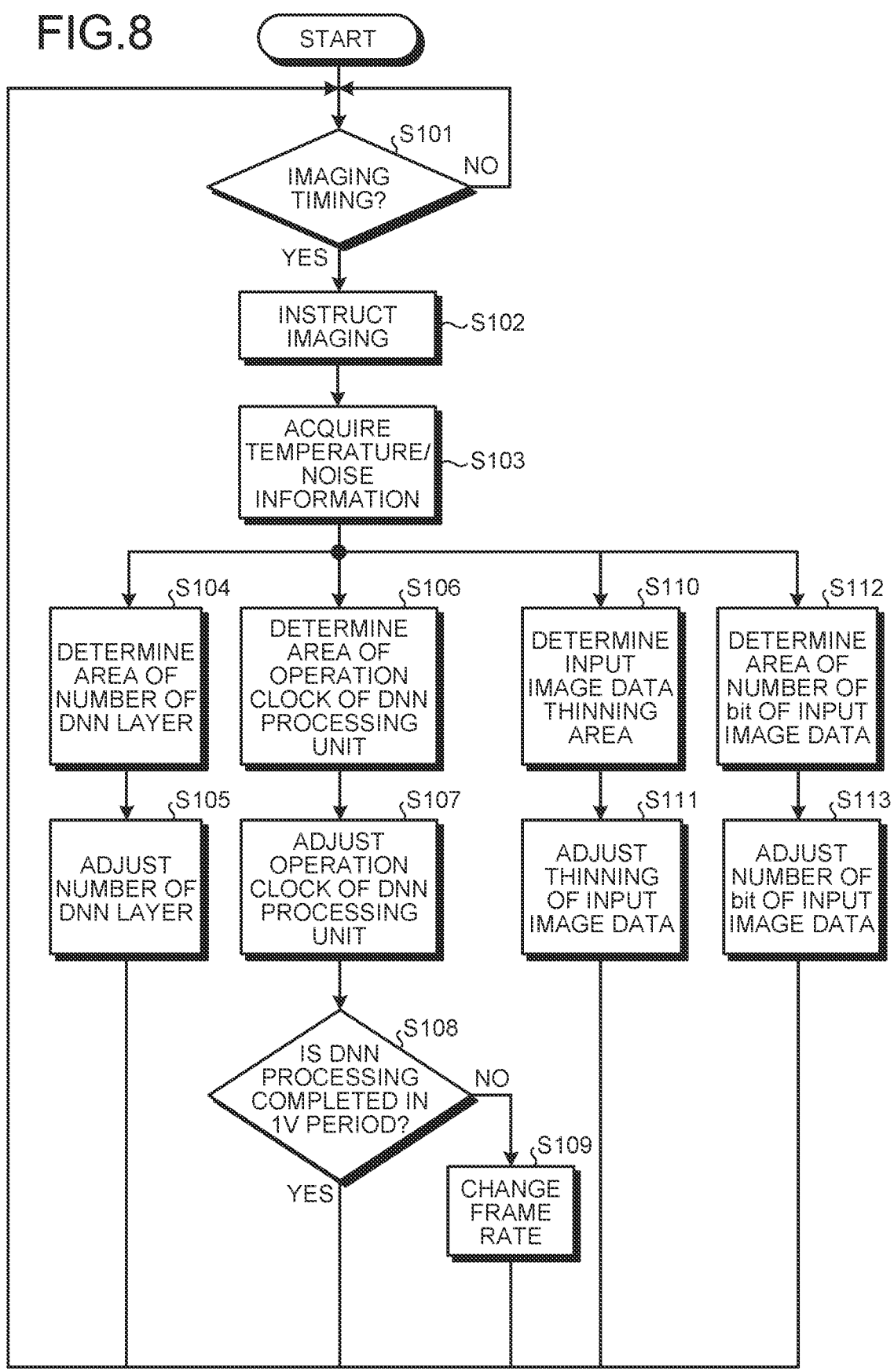
FIG. 8 is a flowchart illustrating an example of processing executed by a CIS control unit according to the first embodiment.

Next, the process executed by the CIS control unit 21 will be described with reference to FIG. 8. FIG. 8 is a flowchart illustrating an example of the processing executed by the CIS control unit according to the first embodiment. The CIS control unit 21 continuously executes the processing illustrated in FIG. 8 in a period in which the power of the electronic equipment 1 is on.

Specifically, as illustrated in FIG. 8, for example, when the power of the electronic equipment 1 is turned on, the CIS control unit 21 first determines whether imaging timing is reached (Step S101). Note that the imaging timing here means timing at which the imaging unit 22 is exposed.

In a case of determining that the imaging timing is not reached (Step S101, No), the CIS control unit 21 repeats the determination processing of Step S101 until the imaging timing is reached. Then, in a case of determining that the imaging timing is reached (Step S101, Yes), the CIS control unit 21 gives an imaging instruction to the imaging unit 22 (Step S102).

Then, the CIS control unit 21 acquires temperature/noise information from the temperature detection unit 25 and the noise detection unit 26 (Step S103). Subsequently, on the basis of the area map, the CIS control unit 21 determines an area of the number of DNN layers that becomes a depth of layers of a DNN used by the DNN processing unit 23 (Step S104). Then, the CIS control unit 21 adjusts the number of DNN layers of the DNN used by the DNN processing unit 23 on the basis of the adjustment information (Step S105), and shifts the processing to Step S101.

Also, the CIS control unit 21 executes processing of Step S106 to S109 in parallel with the processing of Step S104 and S105. Specifically, the CIS control unit 21 determines an operation clock area of the DNN processing unit 23 on the basis of the area map (Step S106).

Subsequently, the CIS control unit 21 adjusts the operation clock of the DNN processing unit 23 on the basis of the adjustment information (Step S107), and determines whether the DNN processing is completed in the 1V period (Step S108). Then, in a case of determining that the DNN processing is completed within the 1V period (Step S108, Yes), the CIS control unit 21 shifts the processing to Step S101.

Also, in a case of determining that the DUN processing is not ended within the 1V period (Step S108, No), the CIS control unit 21 makes an adjustment of changing (extending) a frame rate (Step S109), and shifts the processing to Step S101.

Also, the CIS control unit 21 executes processing of Step S110 and S111 in parallel with the processing of Step S106 to S109. Specifically, the CIS control unit 21 performs input image data thinning area determination with respect to the DNN processing unit 23 on the basis of the area map (Step S110). Then, the CIS control unit 21 makes an input image data thinning adjustment on the basis of the adjustment information (Step S111), and shifts the processing to Step S101.

Also, the CIS control unit 21 performs processing of Step S112 and S113 in parallel with the processing of Step S110 and S111. Specifically, the CIS control unit 21 determines an area of the number of bits of input image data with respect to the DNN processing unit 23 on the basis of the area map (Step S112).

Then, the CIS control unit 21 adjusts the number of bits of an input image on the basis of the adjustment information (Step S113), and shifts the processing to Step S101. The CIS control unit 21 repeatedly executes the processing of Step S101 to S113 in a period in which the power of the electronic equipment 1 is on.

1-8. Modification Example of Control Performed by the CIS Control Unit

Note that the first to fourth control described with reference to FIG. 2 to FIG. 5 are examples of control performed by the CIS control unit 21 to control temperature information of the CIS 2, and the CIS control unit 21 can control the temperature information of the CIS 2 by perforating other control.

Figure 9:
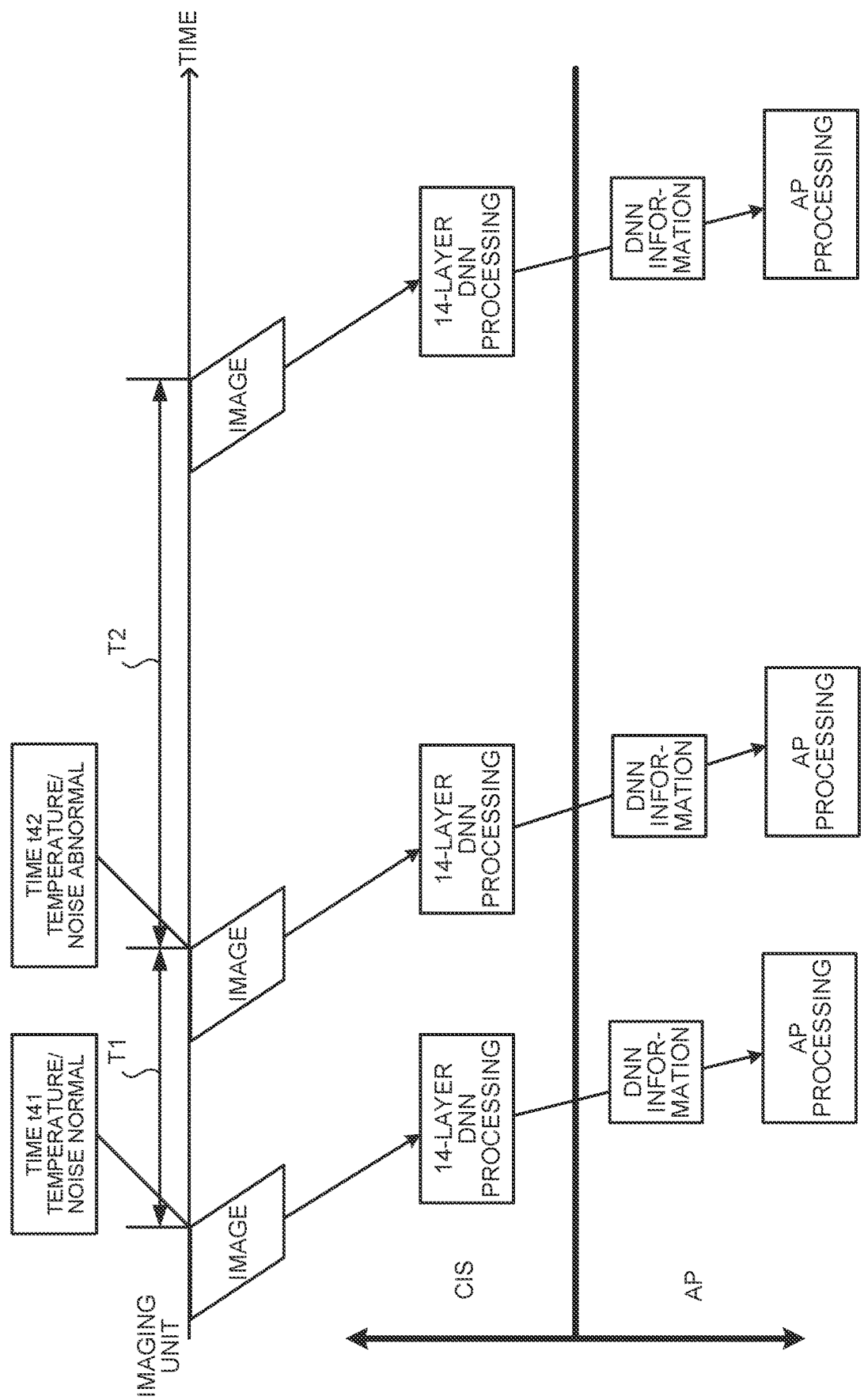
FIG. 9 is a view for describing control according to a modification example of the first embodiment.

Here, with reference to FIG. 9, a modification example of the control performed by the CIS control unit 21 to control temperature information of the CIS 2 will be described. FIG. 9 is a view for describing control according to a modification example of the first embodiment.

As illustrated in FIG. 9, in a case of determining that temperature/noise in the CIS 2 is normal at time t41 and there is no need to limit the processing performed by the DUN processing unit 23, the CIS control unit 21 causes the imaging unit 22 to output image data to the DNN processing unit 23 in the predetermined time interval T1.

Then, in a case of determining that the temperature/noise in the CIS 2 is abnormal at time t42 and there is a need to limit, the processing performed by the DNN processing unit 23, the CIS control unit 21 lowers a frame rate. As a result, the predetermined time interval T1 (1V period) in which image data is output from the imaging unit 22 to the DNN processing unit 23 is extended to T2.

As a result, time in which the DNN processing is not performed is extended and the temperature information is controlled in the DNN processing unit 23. In such a manner, the CIS control unit 21 can control a temperature rise in the CIS 2 also by changing a frame rate of image data on which the DNN processing is performed by the DNN processing unit 23.

2. Second Embodiment

Figure 10:
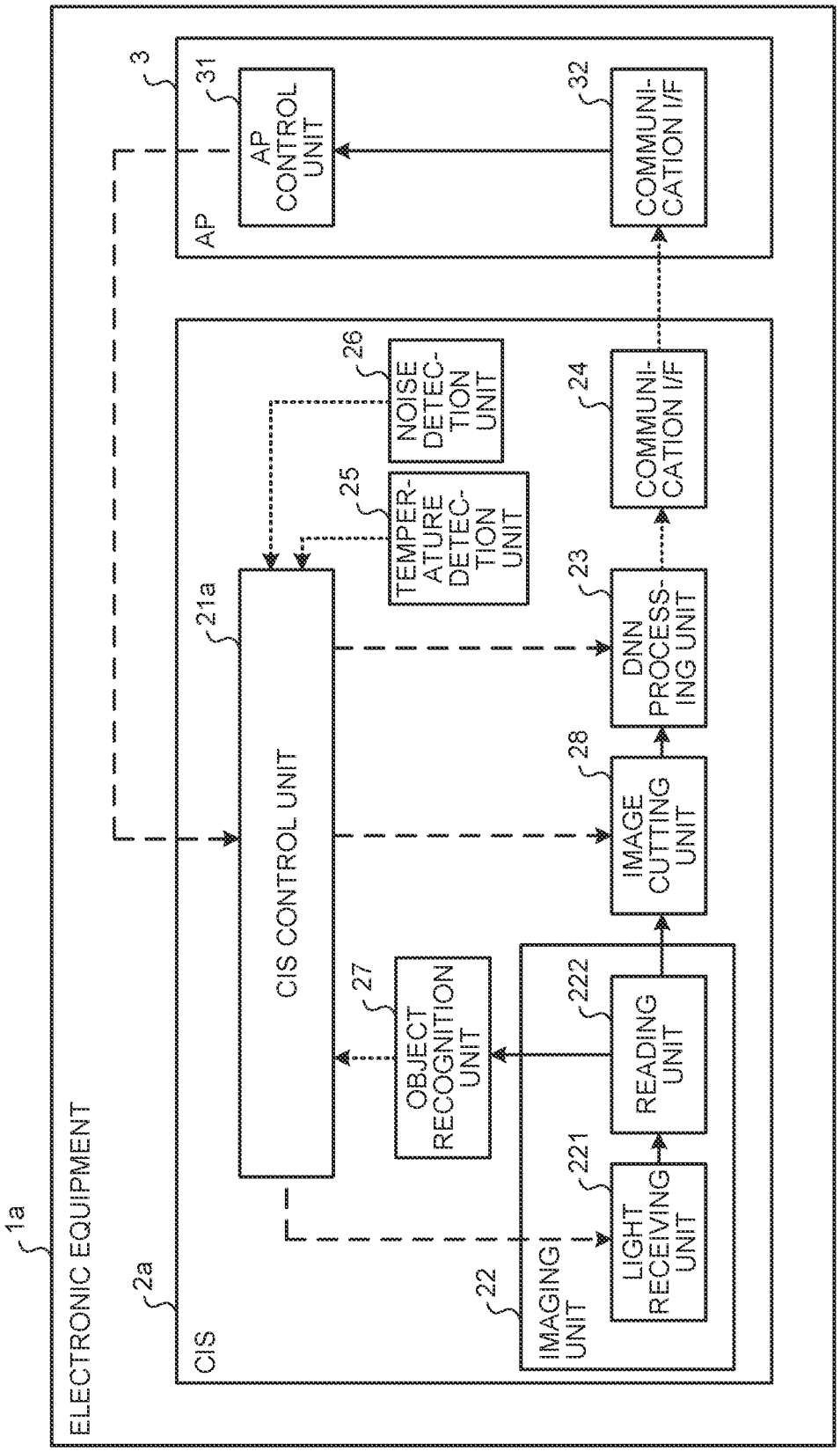
FIG. 10 is a block diagram illustrating a schematic configuration of electronic equipment according to a second embodiment.

2-1. Configuration of Electronic Equipment According to the Second Embodiment Next, the configuration of the electronic equipment according to the second embodiment will be described with reference to FIG. 10. FIG. 10 is a block diagram illustrating a schematic configuration example of the electronic equipment according to the second embodiment.

As illustrated in FIG. 10, in electronic equipment 1a according to the second embodiment, a CIS 2a includes an object recognition unit 27 and an image cutting unit 28 in addition to the configuration included in the electronic equipment 1 illustrated in FIG. 1. Thus, in the electronic equipment 1a, control performed by a CIS control unit 21a to control a temperature rise is different from that of the CIS control unit 21 illustrated in FIG. 1.

Specifically, the object recognition unit 27 acquires image data of a captured image from a reading unit 222 of an imaging unit 22, and recognizes a plurality of objects from the image data. Then, the object recognition unit 27 calculates a score indicating a degree of reliability of a result of the recognition with respect to each recognized object.

For example, in a case where a plurality of people is in the captured image, the object recognition unit 27 recognizes faces of the people by pattern recognition or machine learning. Then, the object recognition unit 27 calculates a score indicating certainty that a face of each object is a human face.

Note that in a case where the object is a person, the object recognition unit 27 can recognize not only the face but also an age and gender of the object, and can calculate a score indicating certainty of each result of the recognition. The object recognition unit 27 outputs information indicating a position of the recognized object in the captured image, and a calculated score of each image to the CIS control unit 21a.

The CIS control unit 21a selects an object, image data of which is input into a DNN processing unit 23, on the basis of the score input from the object recognition unit 27. Then, the CIS control unit 21a outputs information indicating a position of the selected object in the image, and a cutting instruction of the image of the selected object to the image cutting unit 28.

At this time, the CIS control unit 21a selects an object, image data of which is input into the DNN processing unit 23, according to temperature information input from a temperature detection unit 25 and noise information input from a noise detection unit 26.

For example, the CIS control unit 21a selects all objects in a case where a temperature/noise in a CIS 2 is normal, and preferentially selects an object having a high score and does not select an object with a low score in a case where the temperature/noise is abnormal. Mote that a specific example in which the CIS 2a selects an object will be described later with reference to FIG. 11.

The image cutting unit 23 cuts out, from the captured image, an image of the object corresponding to the cutting instruction input from the CIS 2a and performs an output thereof to the DNN processing unit 23. The DNN processing unit 23 performs DNN processing on the image data of the object which data is input from the image cutting unit 23, and outputs DNN information that is a result of the processing to an AP 3.

As a result, for example, in a case where temperature rises or a case where a noise amount is increased, the CIS 2a can control a temperature rise by reducing an amount of image data of the object on which data the DNN processing is performed by the DNN processing unit 23. Note that in the CIS 2a as well, the CIS control unit 21a performs the first to fourth control described in the first embodiments with respect to the DNN processing unit 23. Thus, the CIS 2a can more reliably control the temperature rise.

Figure 11:
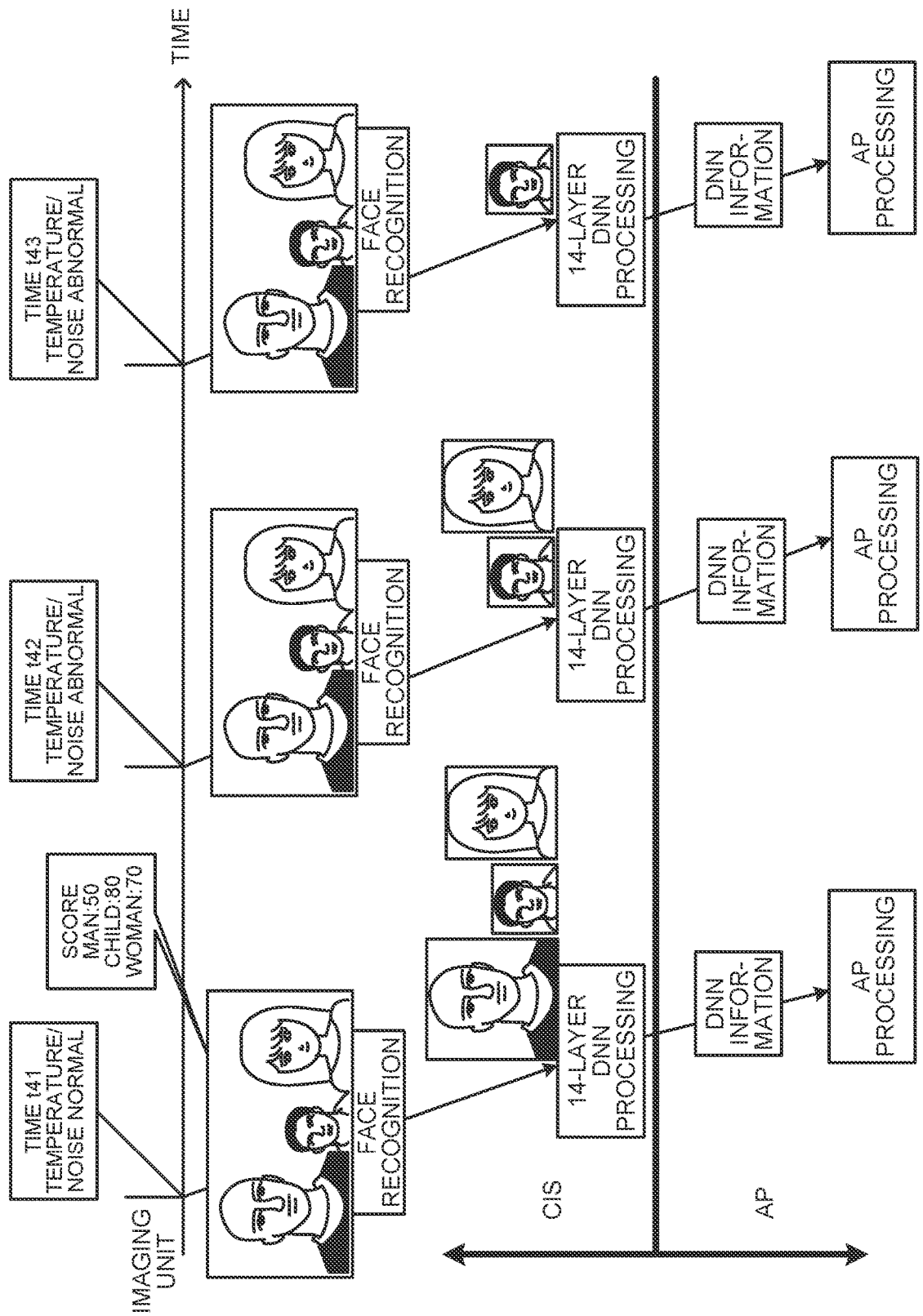
FIG. 11 is a view for describing control according to the second embodiment.

2-2. Control Performed by the CIS Control Unit According to the Second Embodiment Next, an example of the control performed by the CIS control unit 21a according to the second embodiment will be described with reference to FIG. 11. FIG. 11 is a view for describing the control according to the second embodiment. Here, as illustrated in FIG. 11, a case where a man, a woman, and a child are in a captured image will be described as an example. Also, here, a case where scores of objects calculated by the object recognition unit 27 are the man: 50, the child: 80, and the woman: 70 will be described as an example.

As illustrated in FIG. 11, for example, in a case of determining that a temperature/noise in the CIS 2a is normal at time t41, the CIS control unit 21a causes the image cutting unit 28 to output image data of all the objects to the DNN processing unit 23. As a result, the DNN processing unit 23 performs DNN processing with respect to the image data of the man, child, and woman.

Then, in a case of determining that the temperature/noise in the CIS 2a is abnormal at time t42, the CIS control unit 21a excludes, for example, the man having the lowest score among the man, child, and woman from the objects of the DNN processing.

Then, the CIS control unit 21a causes the image cutting unit 28 to output the image data of the child and woman to the DNN processing unit 23. As a result, the DNN processing unit 23 performs the DNN processing with respect to the image data of the child and woman. As a result, the CIS control unit 21a can control the temperature rise in the CIS 2a by reducing a data amount of the image data on which the DNN processing is performed by the DNN processing unit 23.

Then, in a case of determining that the temperature/noise in the CIS 2a is still abnormal even at time t43, the CIS control unit 21a then excludes the woman having a lower score between the child and woman from the objects of the DNN processing.

Then, the CIS control unit 21a causes the image cutting unit 28 to output the image data of the child to the DNN processing unit 23. As a result, the DNN processing unit 23 performs the DNN processing with respect to the image data of the child. As a result, the CIS control unit 21a can control the temperature rise in the CIS 2a by further reducing a data amount of the image data on which the DNN processing is performed by the DNN processing unit 23.

Note that here, although a case where the CIS control unit 21a preferentially selects an object, on which the DNN processing is performed by the DNN processing unit 23, on the basis of scores of objects has been described, this is an example. In a case where objects are people, the CIS control unit 21a can preferentially select an object, on which the DNN processing is performed by the DNN processing unit 23, according to other indexes such as age and gender of the objects in addition to the scores.

For example, in a case where the age is used as an index, the CIS control unit 21a can give priority to a child, for example. Also, for example, in a case where the gender is used as an index, the CIS control unit 21a can give priority to a woman. Note that an index used for selection of an object by the CIS control unit 21a, and which object is prioritized according to each index can be arbitrarily set.

Figure 12:
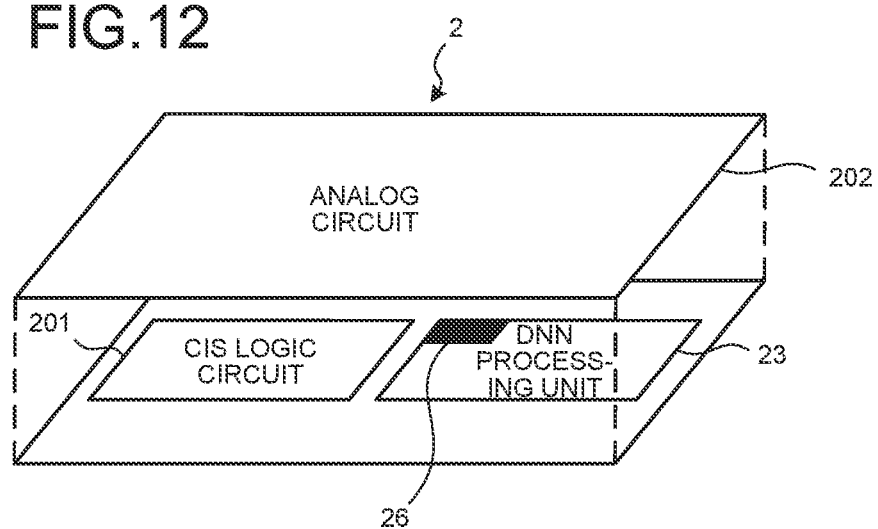
FIG. 12 is a view for describing an arrangement position of a temperature detection unit according to the first and second embodiments.
Figure 13:
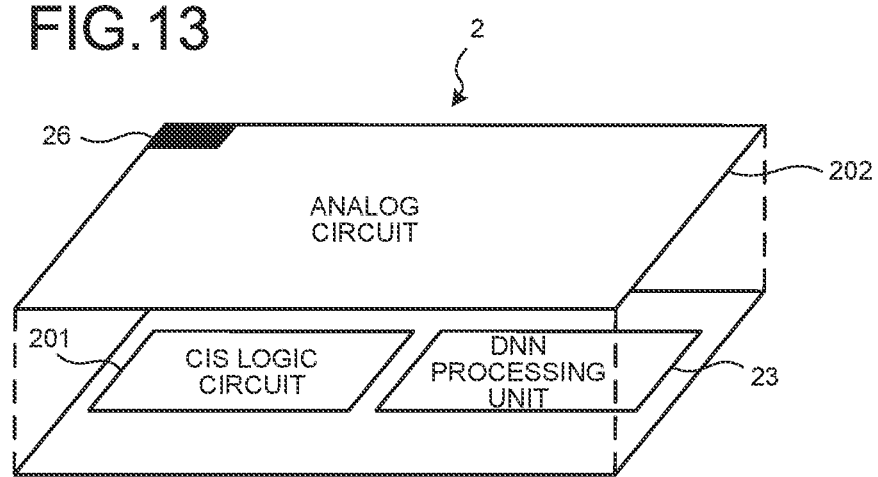
FIG. 13 is a view for describing an arrangement position of the temperature detection unit according to the first and second embodiments.
Figure 14:
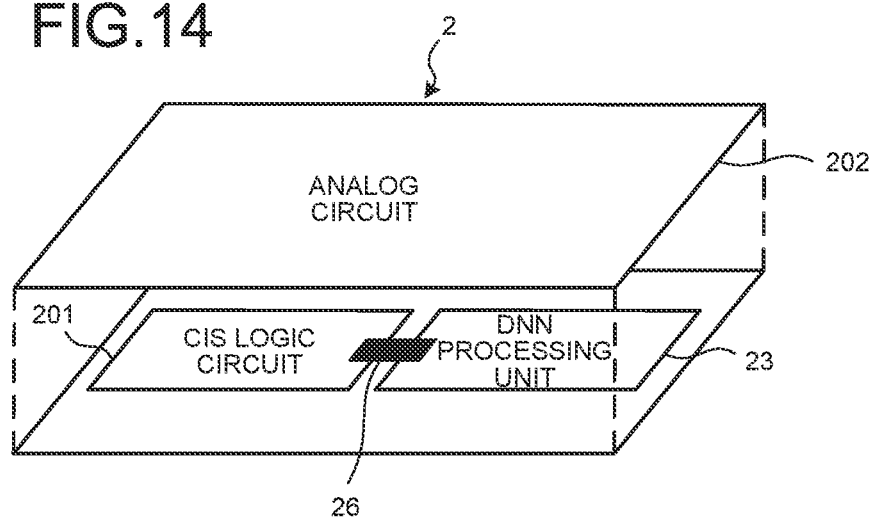
FIG. 14 is a view for describing an arrangement position of the temperature detection unit according to the first and second embodiments.

3. Arrangement Position of a Temperature Detection Unit According to the First and Second Embodiments Next, examples of arrangement positions of the temperature detection units 25 according to the first and second embodiments will be described with reference to FIG. 12 to FIG. 14. FIG. 12 to FIG. 14 are views for describing arrangement positions of the temperature detection units according to the first and second embodiments. Note that the temperature detection units 25 in the first embodiment and the second embodiment are provided at the same position. Thus, here, arrangement positions of a temperature detection unit 25 in a CIS 2 according to the second embodiment will be described.

As illustrated in FIG. 12, for example, the CIS 2 has a structure in which a substrate on which an analog circuit 202 and the like are provided is laminated on a substrate on which a CIS logic circuit 201, a DNN processing unit 23, and the like are provided. The CIS logic circuit 201 includes, for example, a reading unit 222 of an imaging unit 22, and the like. Also, the analog circuit 202 includes, for example, a light receiving unit 221 of the imaging unit 22, and the like.

In such a CIS 2, the DNN processing unit 23 is a main heat source. Thus, as illustrated in FIG. 12, the temperature detection unit 25 is provided, for example, in the vicinity of the DNN processing unit 23 that is the heat source. As a result, the CIS 2 can quickly control temperature information by promptly detecting the heat generation by the heat source.

Also, in the CIS 2, a generation source of noise due to the temperature rise in the DNN processing unit 23 is the analog circuit 202. Thus, as illustrated in FIG. 13 the temperature detection unit 25 may be provided, for example, in the vicinity of the analog circuit 202 that is the generation source of noise.

As a result, since being able to promptly detect the noise generated in the analog circuit 202 due to the temperature rise in the DNN processing unit 23, the CIS 2 can take a measure to reduce the noise by quickly performing control of controlling the temperature rise.

Also, as illustrated in FIG. 14, the temperature detection unit 25 may be provided at an intermediate position between the DNN processing unit 23 that is the heat source and the analog circuit 202 that is the generation source of noise. This allows the CIS 2 to control the temperature rise and to reduce the noise on the basis not of a local temperature inside but of a temperature close to an average temperature of the inside as a whole.

4. Other Embodiments

The processing according to each of the above-described embodiments may be carried out in various different forms other than each of the above-described embodiments.

For example, in each of the above embodiments, a case where the information processing unit that performs processing with respect to image data captured by the CIS 2 is the DNN processing unit 23 has been described as an example. However, an information processing unit included in a CIS 2 may perform processing other than DNN processing. For example, an information processing unit may perform processing of removing noise from image data, processing of adjusting a white balance of an image, and the like.

In each of the above embodiments, a DNN is used for estimation, recognition, and discrimination of an object which are performed inside the CIS 2. However, in addition to a DNN, various neural networks such as recurrent neural networks (RNN) and a convolutional neural network (CNN) can be used. Also, in addition to a learning model using the DNN or the like, a learning model learned by various other kinds of machine learning such as a decision tree or a support vector machine can also be used. Also, although a case where the CIS 2 acquires a DNN from the AP 3 and causes the DNN processing unit 23 to make use thereof has been described in each of the above embodiments, a DNN may be stored in advance on a side of the CIS 2. Also, in the first control described above, the CIS control unit 21 determines a DNN (14 layers or 3 layers) used by the DNN processing unit 23 according to temperature, and determines up to which layer in one DNN the DNN processing is to be performed. However, such determination may be made by the AP 3.

In a case of such a configuration, the CIS 2 outputs temperature information to the AP 3. The AP 3 provides the CIS 2 with a DNN of the number of layers corresponding to the temperature information input from the CIS 2, and gives an instruction indicating up to which layer the DNN processing is to be performed according to the temperature information.

Also, in the third control described above, control of thinning image data on which the DNN processing is performed by the DNN processing unit 23 is performed in a case where a temperature/noise in the CIS 2 is abnormal. However, for example, in a case where temperature exceeds a predetermined upper limit value, an operation of the DNN processing unit 23 may be stopped.

The processing procedures, control procedures, specific names, and information including various kinds of data or parameters illustrated in the above document and the drawings can be arbitrarily changed unless otherwise specified. Also, the specific examples, distributions, numerical values, and the like described in the examples are merely examples and can be arbitrarily changed.

Also, each component of each of the illustrated devices is a functional concept, and does not need to be physically configured in a manner illustrated in the drawings. That is, a specific form of distribution/integration of each device is not limited to what is illustrated in the drawings, and a whole or part thereof can be functionally or physically distributed/integrated in an arbitrary unit according to various loads and usage conditions. For example, the CIS control unit 21 and the DNN processing unit 23 illustrated in FIG. 1 may be integrated.

Also, the above-described embodiments and modification examples can be arbitrarily combined in a range in which the processing contents do not contradict each other.

5. Effect

The CIS 2 has the imaging unit 22, the DNN processing unit 23, the temperature detection unit 25, and the CIS control unit 21. The imaging unit 22 captures an image and generates image data. The DNN processing unit 23 performs processing with respect to the image data read from the imaging unit 22. The temperature detection unit 25 detects temperature. The CIS control unit 21 changes processing performed by the DNN processing unit 23 according to the temperature detected by the temperature detection unit 25. As a result, the CIS 2 can control a temperature rise by making changes such as shortening processing time of the DNN processing unit 23 or reducing a processing amount thereof in a case where the temperature rises, for example.

Also, the CIS 2 further includes the noise detection unit 26 that detects noise included in the image data. Then, the CIS control unit 21 controls an operation of the DNN processing unit 23 according to the noise detected by the noise detection unit 26. As a result, in a case where an amount of noise due to a temperature rise is increased, the CIS 2 can control the temperature rise by decreasing the temperature or the DNN processing unit 23 by making changes such as shortening processing time of the DNN processing unit 23 or reducing a processing amount thereof.

Also, the DNN processing unit 23 is a processing unit that performs DNN processing using a DNN with respect to image data. Then, the CIS control unit 21 changes a depth of layers of the DNN to be processed by the DNN processing unit 23. As a result, in a case where the temperature rises, the CIS 2 can control the temperature rise by making the depth of layers of the DNN to be processed by the DNN processing unit 23 shallower.

Also, the CIS control unit 21 makes selection from a plurality of DNNs having different depths of layers and changes a DNN used by the DNN processing unit 23. As a result, in a case where the temperature rises, the CIS 2 can control the temperature rise by causing the DNN processing unit 23 to use a DNN having a shallow depth of layers.

Also, the CIS control unit 21 changes a depth of layers, on which processing is to be performed by the DNN processing unit 23, among all the layers in one DNN. As a result, in a case where the temperature rises, the CIS 2 can control the temperature rise by reducing the number of layers of the DNN to be processed by the DNN processing unit 23.

Also, the CIS control unit 21 changes an operation clock of the DNN processing unit 23. As a result, in a case where the temperature rises, the CIS 2 can control the temperature rise by slowing down the operation clock of the DNN processing unit 23.

Also, the CIS control unit 21 thins out image data to be processed by the DNN processing unit 23. As a result, the CIS 2 can control the temperature rise by reducing an amount of data to be processed by the DNN processing unit 23.

Also, the CIS control unit 21 changes a data amount of image data in one frame which data is to be processed by the DNN processing unit 23. As a result, in a case where the temperature rises, the CIS 2 can control the temperature rise by reducing the data amount of the image data in one frame which data is to be processed by the DNN processing unit 23.

Also, the CIS control unit 21 changes a frame rate of the image data to be processed by the DNN processing unit 23. As a result, the CIS 2 can control the temperature rise by lowering the frame rate of the image data to be processed by the DNN processing unit 23.

Also, the CIS 2a has the object recognition unit 27 that recognizes a plurality of objects from image data and calculates scores of the objects. Then, the CIS control unit 21a selects data of an object to be processed by the DNN processing unit 23 from image data in one frame on the basis of the scores of the objects. As a result, the CIS 2a can control the temperature rise by reducing an amount of data to be processed by the DNN processing unit 23.

Also, the temperature detection unit 25 is provided in the vicinity of the DNN processing unit 23 that is a heat source. As a result, the CIS 2 can control temperature information by promptly detecting heat generation by the heat source.

Also, the temperature detection unit 25 is provided in the vicinity of the imaging unit 22 that is a generation source of noise. As a result, by promptly detecting generation of noise due to a temperature rise and quickly performing control of controlling the temperature rise, the CIS 2 can take a measure to reduce the noise.

Also, the temperature detection unit 25 is provided at a central position in the CIS 2. This allows the CIS 2 to control a temperature rise and to reduce noise on the basis not of a local temperature in the CIS 2 but of a temperature close to an average temperature of the all.

Also, the electronic equipment 1 has the CIS 2. The CIS 2 includes the imaging unit 22, the DNN processing unit 23, the temperature detection unit 25, and the CIS control unit 21. The imaging unit 22 captures an image and generates image data. The DNN processing unit 23 performs processing with respect to the image data read from the imaging unit 22. The temperature detection unit 25 detects temperature. The CIS control unit 21 changes an operation of the DNN processing unit 23 according to the temperature detected by the temperature detection unit 25. As a result, the electronic equipment 1 can control a temperature rise by making changes such as shortening processing time of the DNN processing unit 23 or reducing a processing amount thereof in a case where the temperature rises, for example.

Also, an imaging method includes an imaging step, an information processing step, a temperature detecting step, and a controlling step that are executed by a computer. In the imaging step, an image is captured and image data is generated. In the information processing step, processing is performed with respect to the image data generated in the imaging step. In the temperature detecting step, temperature is detected. In the controlling step, processing to be performed in the information processing step is changed according to the temperature detected in the temperature detecting step. As a result, the CIS 2 can control a temperature rise by making changes such as shortening processing time of the DNN processing unit 23 or reducing a processing amount thereof in a case where the temperature rises, for example.

Also, an effect described in the present description is merely an example and is not a limitation, and there may be a different effect.

Note that the present technology can also have the following configurations.

(1)
  An imaging device including:
    an imaging unit that captures an image and generates image data;
    an information processing unit that performs processing with respect to the image data read from the imaging unit;
    a temperature detection unit that detects temperature; and
    a control unit that changes the processing performed by the information processing unit according to the temperature detected by the temperature detection unit.

(2)
  The imaging device according to (1), further including
    a noise detection unit that detects noise included in the image data, wherein
    the control unit
    controls an operation of the information processing unit according to the noise detected by the noise detection unit.

(3)
  The imaging device according to (1) or (2), wherein
    the information processing unit is
    a processing unit that performs DNN processing using a deep neural network (DNN) with respect to the image data, and
    the control unit
    changes a depth of layers of the DNN to be processed by the information processing unit.

(4)
  The imaging device according to (3), wherein
    the control unit
    changes the DNN used by the information processing unit by making a selection from a plurality of the DNNs having different depths of the layers.

(5)
  The imaging device according to (3), wherein
    the control unit
    changes a depth of layers, on which the processing is to be performed by the information processing unit, among all layers in one of the DNNs.

(6)
  The imaging device according to any one of (1) to (5), wherein
    the control unit
    changes an operation clock of the information processing unit.

(7)
  The imaging device according to any one of (1) to (6), wherein
    the control unit
    thins out the image data to be processed by the information processing unit.

(8)
  The imaging device according to any one of (1) to (7), wherein
    the control unit
    changes a data amount of the image data in one frame which data is to be processed by the information processing unit.

(9)
  The imaging device according to any one of (1) to (8), wherein
    the control unit
    changes a frame rate of the image data to be processed by the information processing unit.

(10)
  The imaging device according to any one of (1) to (9), further including
    a recognition unit that recognizes a plurality of objects from the image data and calculates scores of the objects, wherein
    the control unit
    selects data of the objects, which data is to be processed by the information processing unit, from the image data in one frame on the basis of the scores of the objects.

(11)
  The imaging device according to any one of (1) to (10), wherein
    the temperature detection unit is
    provided in a vicinity of a heat source.

(12)
  The imaging device according to any one of (1) to (10) wherein
    the temperature detection unit is
    provided in a vicinity of a generation source of noise.

(13)
  The imaging device according to any one of (1) to (10) wherein
    the temperature detection unit is
    provided at a central position in the imaging device.

(14)
14. Electronic equipment including:
    an imaging device including
    an imaging unit that captures an image and generates image data,
    an information processing unit that performs processing with respect to the image data read from the imaging unit,
    a temperature detection unit that detects temperature, and
    a control unit that changes an operation of the information processing unit according to the temperature detected by the temperature detection unit.

(15)
15. An imaging method including:
    an imaging step of capturing an image and generating image data;
    an information processing step of performing processing with respect to the image data generated in the imaging step;
    a temperature detecting step of detecting temperature; and a controlling step of changing the processing performed in the information processing step according to the temperature detected in the temperature detecting step, the steps being executed by a computer.

REFERENCE SIGNS LIST 1, 1a ELECTRONIC EQUIPMENT
2, 2a CIS
21, 21a CIS CONTROL UNIT
22 IMAGING UNIT
221 LIGHT RECEIVING UNIT
222 READING UNIT
23 DNN PROCESSING UNIT
24 COMMUNICATION I/F
25 TEMPERATURE DETECTION UNIT
26 NOISE DETECTION UNIT
27 OBJECT RECOGNITION UNIT
28 IMAGE CUTTING UNIT
3 AP
31 AP CONTROL UNIT
32 COMMUNICATION I/F

The invention claimed is:

1. An imaging device comprising:
an image sensor configured to capture an image and generate image data;
a first electronic controller configured to perform processing with respect to the image data read from the image sensor, the first electronic controller including an electronic processor and a memory, the memory including a plurality of deep neural networks (DNNs), each of the plurality of DNNs having a depth of layers;
a temperature sensor configured to detect temperature; and
a second electronic controller configured to change the processing performed by the first electronic controller according to the temperature detected by the temperature sensor.

2. The imaging device according to claim 1, further comprising:
a noise detection circuitry configured to detect an amount of noise generated in an analog circuit of the image sensor, wherein
the second electronic controller is further configured to control an operation of the first electronic controller according to the noise detected by the noise detection circuitry.

3. The imaging device according to claim 1, wherein
the first electronic controller is further configured to perform DNN processing using one DNN of the plurality of DNNs with respect to the image data, and
the second electronic controller is further configured to change a first depth of layers of the one DNN.

4. The imaging device according to claim 3, wherein
the second electronic controller is further configured to change from the one DNN to a second DNN of the plurality of the DNNs, the second DNN having a second depth of layer that is different from the first depth of layers of the one DNN.

5. The imaging device according to claim 3, wherein
the second electronic controller is further configured to change the depth of layers, on which the processing is to be performed by the first electronic controller, among all layers in one of the DNNs.

6. The imaging device according to claim 1, wherein
the second electronic controller is further configured to change an operation clock of the first electronic controller.

7. The imaging device according to claim 1, wherein
the second electronic controller is further configured to thin out the image data to be processed by the first electronic controller.

8. The imaging device according to claim 1, wherein
the second electronic controller is further configured to change a data amount of the image data in one frame which data is to be processed by the first electronic controller.

9. The imaging device according to claim 1, wherein
the second electronic controller is further configured to change a frame rate of the image data to be processed by the first electronic controller.

10. The imaging device according to claim 1, further comprising
an object recognition circuitry that recognizes a plurality of objects from the image data and calculates scores of the plurality of objects, wherein
the second electronic controller is further configured to select data of the plurality of objects, which data is to be processed by the first electronic controller, from the image data in one frame on the basis of the scores of the plurality of objects.

11. The imaging device according to claim 1, wherein
the temperature sensor is provided in a vicinity of a heat source.

12. The imaging device according to claim 1, wherein
the temperature sensor is provided in a vicinity of a generation source of noise.

13. The imaging device according to claim 1, wherein
the temperature sensor is provided at a central position in the imaging device.

14. An electronic apparatus comprising:
an imaging device including
an image sensor configured to capture an image and generate image data,
a first electronic controller configured to perform processing with respect to the image data read from the image sensor, the first electronic controller including an electronic processor and a memory, the memory including a plurality of deep neural networks (DNNs), each of the plurality of DNNs having a depth of layers,
a temperature sensor configured to detect a temperature, and
a second electronic controller configured to change an operation of the first electronic controller according to the temperature detected by the temperature sensor.

15. The electronic apparatus according to claim 14, further comprising:
a noise detection circuitry configured to detect an amount of noise generated in an analog circuit of the image sensor, wherein
the second electronic controller is further configured to control the operation of the first electronic controller according to the noise detected by the noise detection circuitry.

16. The electronic apparatus according to claim 14, wherein
the first electronic controller is further configured to perform DNN processing using one DNN of the plurality of DNNs with respect to the image data, and the second electronic controller is further configured to change a first depth of layers of the one DNN.

17. The electronic apparatus according to claim 16, wherein
the second electronic controller is further configured to change from the one DNN to a second DNN of the plurality of the DNNs, the second DNN having a second depth of layer that is different from the first depth of layers of the one DNN.

18. The electronic apparatus according to claim 16, wherein
the second electronic controller is further configured to change the depth of layers, on which the processing is to be performed by the first electronic controller, among all layers in one of the DNNs.

19. The electronic apparatus according to claim 14, wherein
the second electronic controller is further configured to change an operation clock of the first electronic controller.

20. An imaging method comprising:
capturing, with an image sensor, an image and generating image data;
processing, with a first electronic controller, the image data that is generated, the first electronic controller including an electronic processor and a memory, the memory including a plurality of deep neural networks (DNNs), each of the plurality of DNNs having a depth of layers;
detecting, with a temperature sensor, a temperature; and
changing, with a second electronic controller, the processing by the first electronic controller on the image data according to the temperature that is detected.

* * * * *